J. R. SNYDER.
ENGINEER'S BRAKE VALVE.
APPLICATION FILED JULY 5, 1912.

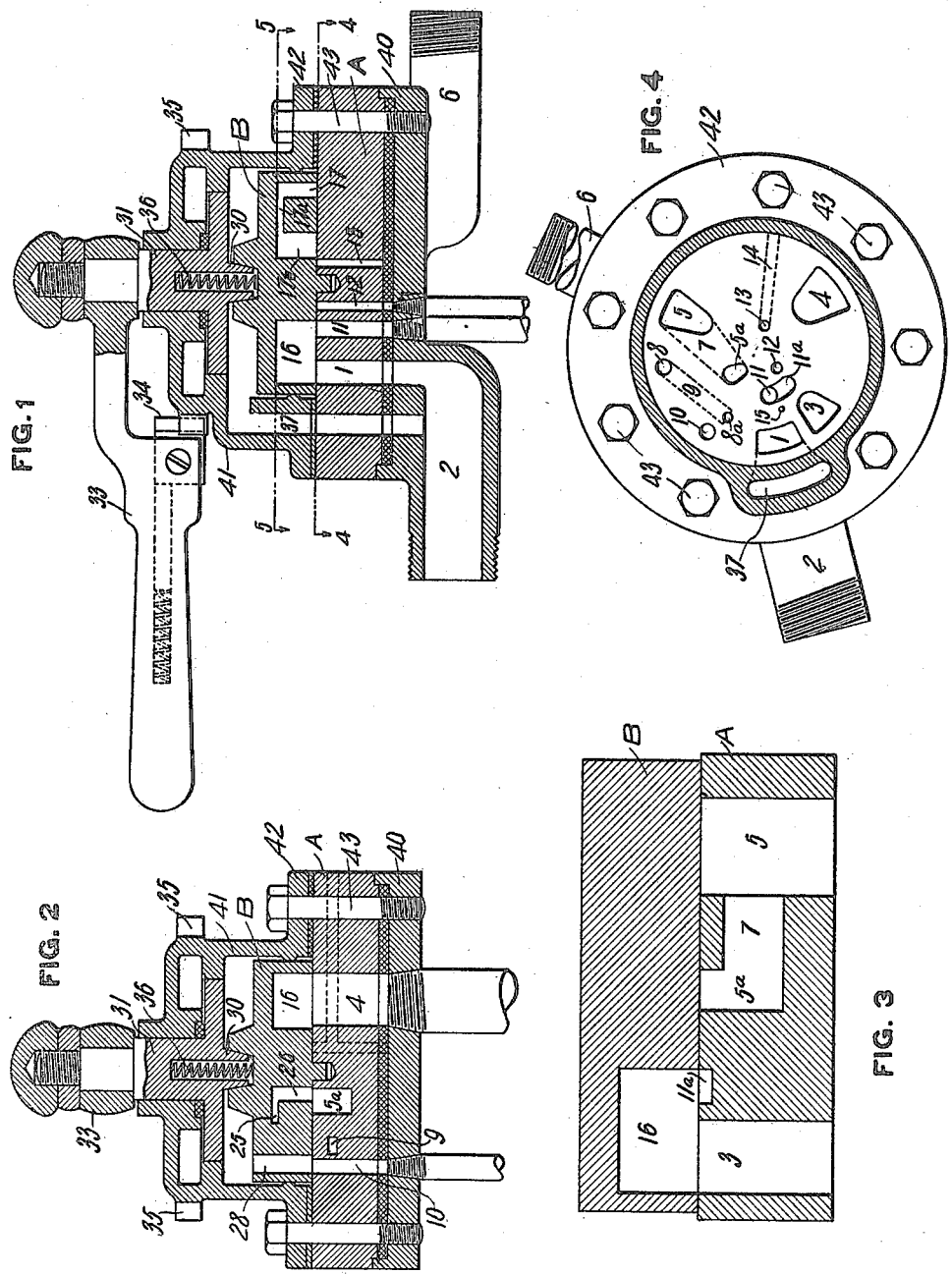

1,208,033.

Patented Dec. 12, 1916.
3 SHEETS—SHEET 2.

WITNESSES
W. T. Holman
Wm. P. Larkin

INVENTOR
Jacob Rush Snyder
By Fredk W. Winter
Attorney

J. R. SNYDER.
ENGINEER'S BRAKE VALVE.
APPLICATION FILED JULY 5, 1912.
1,208,033.
Patented Dec. 12, 1916.
3 SHEETS—SHEET 3.
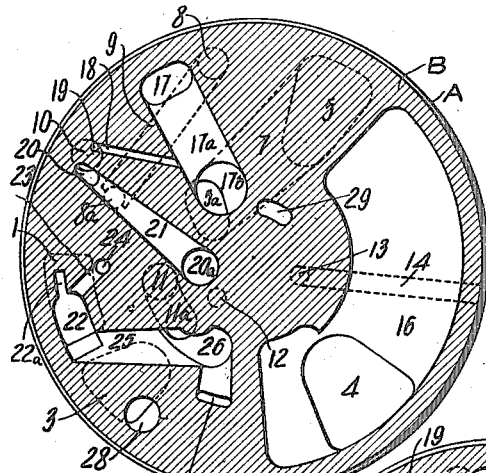
FIG. 7
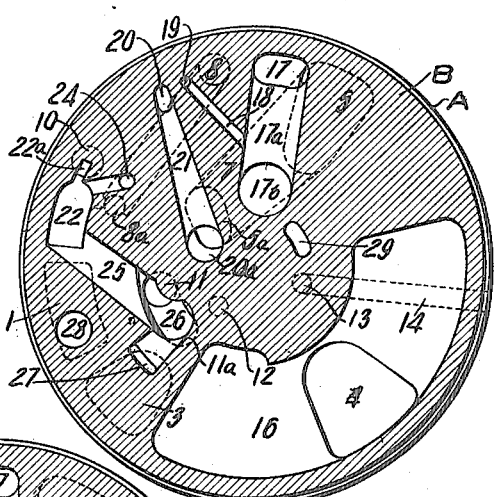
FIG. 11
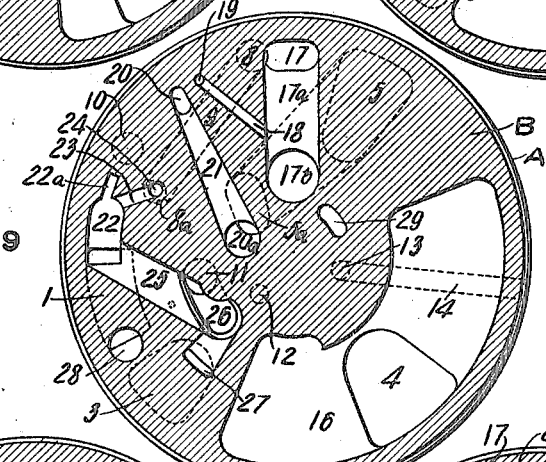
FIG. 9
FIG. 8
FIG. 10
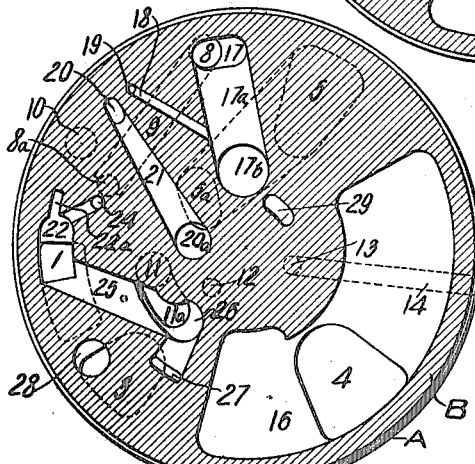
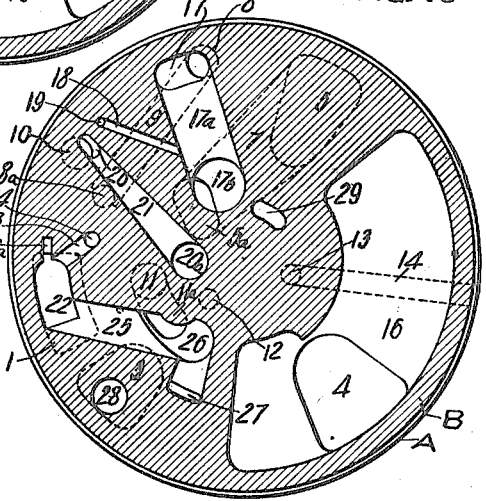
WITNESSES
INVENTOR

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

ENGINEER'S BRAKE-VALVE.

1,208,033.

Specification of Letters Patent.

Patented Dec. 12, 1916.

Application filed July 5, 1912. Serial No. 707,737.

*To all whom it may concern:*

Be it known that I, JACOB RUSH SNYDER, a resident of Pittsburgh, in the county of Allegheny and State of Pennsylvania, have invented a new and useful Improvement in Engineers' Brake-Valves, of which the following is a specification.

This invention relates to engineer's brake valve for air brake systems.

The object of the invention is to provide an engineer's valve which gives a better control of the engine and train, both jointly and separately, than engineers' valves as heretofore constructed.

The invention comprises a valve having ports, cavities and passages arranged and controlled as hereinafter described and claimed.

Figure 14:
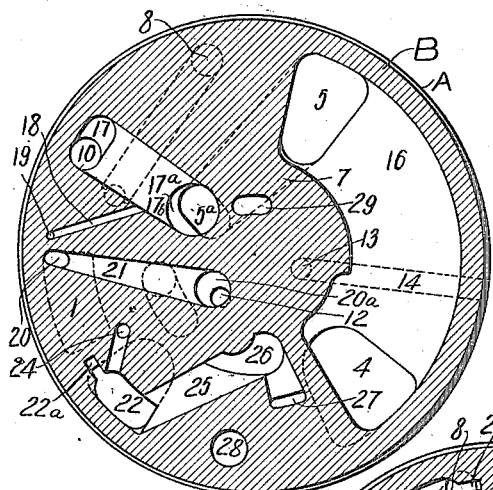
Figure 13:
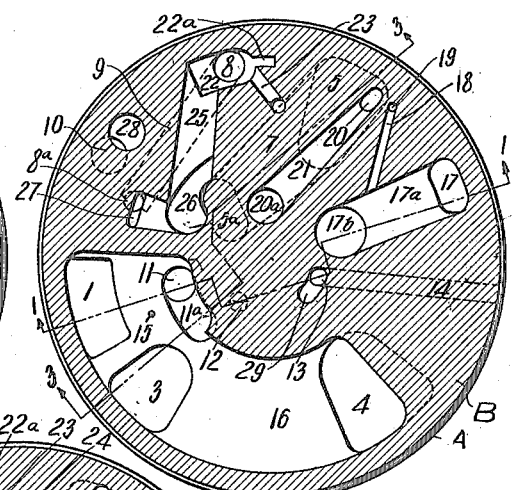

In the accompanying drawings, Figure 1 is a vertical section through the valve in full release position, taken on the line 1—1, Fig. 13; Fig. 2 is a similar view, taken on the line 2—2, Fig. 12; Fig. 3 is a detail sectional view through the valve seat and rotary disk on the line 3—3, Fig. 13; Fig. 4 is a horizontal section on the line 4—4, Fig. 1; showing the valve seat in plan view; and Figs. 5, 6, 7, 8, 9, 10, 11, 12, 13 and 14 are diagrammatic views showing the valve seat in plan and the rotary disk in horizontal section on the line 5—5, Fig. 1, and illustrating the different positions of the valve.

The valve, as to its general type, is not materially different from that of existing forms of engineers' brake valves of the rotary type. The essentials of the valve comprise the valve seat A provided with the necessary ports and passages, the rotary disk valve B coöperating with the seat and provided with the necessary cavities and passages to effect the proper combination between the ports in the seat, and the necessary casing and operating means for the valve.

The valve seat is provided with ports and passages as follows: port 1 connected directly to the main reservoir connection 2; port 3 connected to the main reservoir by way of the feed valve; a port 4 connected to the train pipe, preferably through an emergency cut-off valve such as illustrated, described and claimed in my Patent No. 1,089,088, granted March 3, 1914, or as illustrated, described and claimed in my Patent No. 1,094,944, dated April 28, 1914; a port 5 communicating with the exhaust connection 6 and connected by an underneath passage 7 cored out in the seat with a port $5^a$ relatively near to the center of the seat; a port 8 connected either to the engine and tender brake cylinder or to a valve for applying the brakes on the engine and tender, and connected by underneath passage 9 with port $8^a$ located near the main reservoir port 1; a port 10 connected to the equalizing reservoir; a port 11 extended, as at $11^a$, in the face of the seat and connected to an emergency cut-off and train pipe pressure maintenance valve which is so arranged as to admit fluid pressure to a steam cut-off valve and also to the engine brake cylinders in case of bursting of a hose or like emergency, and which maintains the train pipe pressure against leakage, as described in my Patent No. 1,094,944, above identified; a port 12 for direct connection to the steam cut-off valve; a port 13 communicating with passage 14 connected to the pump governor; and a small exhaust or warning port 15.

The rotary disk B is provided with the following ports, cavities and passages, to-wit: a large cavity 16 of general arc-shape and extending about one-third the distance around the disk; a cavity 17 near the periphery of the disk connected by passage $17^a$ with a cavity $17^b$ near the center of the disk and by a small branch passage 18 with a small cavity 19 near the periphery of the disk; a cavity 20 near the periphery of the disk connected by passage 21 with another cavity $20^a$ located relatively near the center of the disk; a cavity 22 located near the periphery of the disk and having at one end an extension $22^a$ and connected by passage 23 with the cavity 24 and by passage 25 with cavity 26, the latter being also connected by a passage with cavity 27; and with two ports extending entirely through the disk, to-wit; a port 28 located relatively near the periphery of the disk and an oblong port 29 located substantially diametrically opposite port 28 but relatively near the center of the disk.

The rotary disk may be actuated in any way, such as by means of a key 30 fitting a socket in the upper face of the disk and provided with an extension 31 extending upwardly through the top member of the casing and having attached to its upper end the operating handle 33 provided with a spring pressed dog 34 for engagement with the notched segment 35, all as is common practice with engineers' brake valves. The rotary disk B is held to the seat A by the combined pressure of spring 36 and main reservoir pressure which passes from the train pipe connection 2 through vertical passage 37 to the upper face of the disk, all as is common in engineers' brake valves and as will be readily understood by those skilled in the art.

In order to obviate the necessity of disturbing the various pipe connections whenever it becomes necessary to inspect or repair the valve seat, the valve seat is formed separate from the casing. As shown, the various pipes are connected to the base portion 40 of the valve casing. The upper portion 41 of the casing carrying the stem 31 and inclosing the rotary disk B is provided with flanges 42 for receiving the bolts 43 connecting the same to the base. The valve seat A is a separate piece interposed between the base 40 and top casing member 41, gaskets being interposed between the same and the base and top casing members and provided with openings through which the bolts 43 pass. This construction enables the rotary disk and valve seat to be renewed whenever desired and reground or refaced if necessary without disturbing the pipe connections to the base or lower member of the casing.

The valve described has ten positions, as follows:

1. Running position, shown in Fig. 5. In this position the large cavity 16 of the rotary disk connects port 3 coming from the main reservoir by way of the feed valve to train pipe port 4 and to the extension $11^a$ of port 11 leading to the emergency cut-off valve hereinbefore referred to, while cavity 26 overlaps emergency cut-off valve port 11, so that communication is also had by way of passage 25 to cavity 22 which overlaps equalizing reservoir port 10. This charges the train pipe and equalizing reservoir to main reservoir pressure as reduced by the feed valve. The emergency cut-off valve in running position is in such position that the air entering port 11 is normally checked at said valve, but should a hose burst or the conductor's valve be opened, with the engineer's brake valve in this position, the emergency cut-off valve moves over so as to admit air entering through port 11 to the engine brake cylinder and to a steam cut-off valve and also to close the communication between the main reservoir and the train pipe, thereby conserving the main reservoir pressure. Port 29 connects the main reservoir with pump governor 13. Engine brake cylinder ports 8 and $8^a$ are lapped, thereby holding the engine brake cylinders in whatever condition they were put by a previous position of the engineer's valve. If by a previous position of the valve the engine brakes have been applied, this position of the valve holds them applied, so that in one sense this position is also a train release and engine holding position. If the engine brakes are applied and it is desired to release the same while maintaining the train brakes released, the valve is moved to the next position now to be described.

2. Engine and train release position, shown in Fig. 6. This position is reached by rotating the disk slightly contra-clockwise from the previous position. It does not disturb any of the connections above described, but in addition brings cavity 20 in the rotary disk over brake cylinder port 8 and cavity $20^a$ in the disk over exhaust port $5^a$, so that the engine brake cylinders are vented through port 8, cavity 20, passage 21 and cavity $20^a$ to exhaust port $5^a$. Port 29 maintains connection from the main reservoir to the pump governor 13.

3. Service position, shown in Fig. 7. This position is secured by a still further rotation of the valve contra-clockwise. In this position the small cavity 19 in the rotary disk overlaps equalizing reservoir port 10, while cavity $17^b$ overlaps exhaust port $5^a$ so that equalizing reservoir air is exhausted through the small port 19 and passage 18. The train pipe connection with the main reservoir is, of course, broken, and equalizing reservoir pressure is reduced to reduce the train pipe pressure and set the train brakes as is the usual practice in air brake systems. The main reservoir port 1 is, however, lapped by cavity 22 while the extension $11^a$ of port 11 is lapped by cavity 26 so that the main reservoir air can flow through cavity 22, passage 25, cavity 26 to port 11 and thence to the emergency cut-off valve, thereby maintaining the latter in such condition that should a hose burst, it will operate in its usual way. The brake cylinder ports 8 and $8^a$ are blanked but the engine brake cylinders are applied by the special valve shown in Patent No. 1,064,021, dated June 10, 1913.

4. Maintenance lap position, shown in Fig. 8. This position is secured from the service position by slightly rotating the valve clockwise. In this position all ports are lapped with the exception that main reservoir port 1 is still connected through cavity 22, passage 25 and cavity 26 to the extension $11^a$ of port 11 to the emergency cut-out valve heretofore described.

5. Engine application position, shown in Fig. 9. This position can be secured either from running position by moving the valve contra-clockwise or from service or maintenance lap position by moving the valve clockwise. In this position the main reservoir port 1 is connected through cavity 22, passage 23 and cavity 24 with brake cylinder port 8ª, thereby applying the engine brake cylinders. Cavities 27 and 26 also connect main reservoir port 3 with port 11 to the emergency cut-off valve. All other ports are blanked.

6. Engine release position, shown in Fig. 10. This position is secured either from engine application position by rotating the valve contra-clockwise or from service position by rotating the valve clockwise. In this position the engine brake cylinder port 8 is connected by cavity 17, passage 17ª, and cavity 17ᵇ with exhaust port 5ª, thus releasing the engine and tender brakes. All other ports are blanked, except that main reservoir port 1 is connected by cavity 22, passage 25 and cavity 26 with the emergency cut-off valve port 11.

7. Graduated release position, shown in Fig. 11. This position is reached from service application position by rotating the valve clockwise. In this position all ports are blanked, except that cavity 27 overlaps main reservoir port 3, thus providing communication to cavity 26 which overlaps emergency cut-off port 11 and through passage 25 to cavity 22 and thence by extension 22ª to equalizing reservoir port 10, thereby increasing equalizing reservoir pressure and through my improved train pipe pressure maintenance valve illustrated, described and claimed in my Patent No. 1,094,944, dated April 28, 1914, increasing the train pipe pressure to an amount corresponding to the increase in equalizing reservoir pressure and releasing the brake pressure to a proportional amount.

8. Train release and engine holding position, shown in Fig. 12. This position is assumed by rotating the valve clockwise from either service or running position. In this position cavity 16 connects main reservoir ports 1 and 3 with train pipe port 4 and with emergency cut-off valve port 11. Port 29 connects main reservoir pressure above the rotary disk with pump governor port 13, and port 28 connects the main reservoir pressure above the rotary disk with equalizing reservoir port 16, thereby increasing train pipe pressure and also equalizing reservoir pressure and releasing the brakes on the train. The brake cylinder ports, however, are lapped so that the engine and tender brakes are held. Cavity 16 also connects the main reservoir ports with warning port 15, so that the engineer is warned not to leave the valve in this position any longer than necessary to bring the train pipe pressure up to the desired degree and fully release the train brakes.

9. Engine and train full release position, shown in Fig. 13. This position is reached by rotating the valve still farther clockwise from the last described position. In this position the main reservoir ports are still connected to the train pipe 4, emergency cut-off valve port 11 and warning port 15. Port 29 still somewhat overlaps pump governor port 13 and port 28 partly overlaps equalizing reservoir port 10. In addition, cavity 26 slightly overlaps exhaust port 5ª, and cavity 22 overlaps brake cylinder port 8 so that the latter is exhausted through cavity 22, passage 25, cavity 26 to exhaust port 5ª. The remaining ports are blanked.

10. Emergency position, shown in Fig. 14. This position is assumed on moving the valve to its extreme contra-clockwise position. In this position the large cavity 16 connects train pipe 4 with large exhaust port 5, thereby evacuating the train pipe very rapidly. At the same time equalizing reservoir port 10 is connected through cavity 17, passage 17ª and cavity 17ᵇ to exhaust port 5ª, so that the equalizing reservoir is also evacuated. Main reservoir port 1 is connected through cavity 20, passage 21 and cavity 20ª to the steam cut-off valve port 12, thus cutting off the supply of steam to the engine cylinders in case of emergency. The brake cylinder ports 8 and 8ª are blanked in this position of the valve, but the engine brake cylinders are applied in this position in the manner as in service position.

The valve described is normally set in running position after having been in full release position. Service and emergency applications are made in the usual way by moving the valve contra-clockwise to the desired degree. After an emergency application the valve is invariably brought back to full release position to quickly charge the train pipe and equalizing reservoir and release the brakes throughout. After service application, the valve can be brought back either to full release position to release the brakes, after which the valve is again set in running position or it may be set in various other positions; for instance, if it is desired to hold the train brakes and release the engine brakes, it is brought back to position 6, engine release position; if it is desired to hold all of the brakes, it is brought back to position 4, maintenance lap position; if it is desired to graduate off the brakes, it is brought back to position 7, graduated release position; or if it is desired to hold the engine brakes and release the train brakes, it is brought back to position 8, train release and engine holding position. Position 5 can also be reached from running position when it is desired to apply only the engine brakes. Position 2 corresponds in its functional effects to position 6, both serving to release the engine brakes, but position 2 will ordinarily be used as the running position on the second or subsequent engine in a multiple header, while position 6 will be the one usually employed on a single engine or the leading engine when the engine brakes alone are to be released.

Emergency cut-off valve port 11 is open to main reservoir pressure in all positions of the brake valve except in emergency position, so that in all other positions of the valve in case of any break in the train line, fluid pressure can pass through port 11 to cut-off the steam supply to the engine cylinders and also apply the engine brakes. When the valve is in emergency position the steam is cut off directly by the flow of pressure from the main reservoir through port 1, cavity 20, passage 21, cavity 20ᵃ to port 12.

Figure 12:
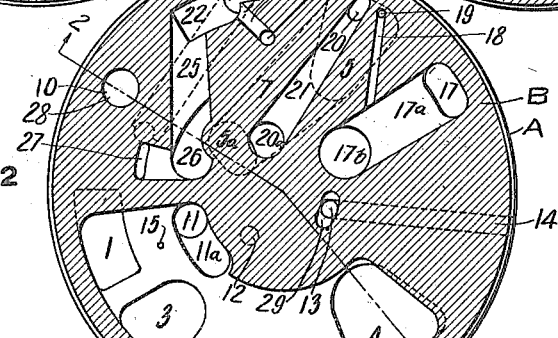
Figure 5:
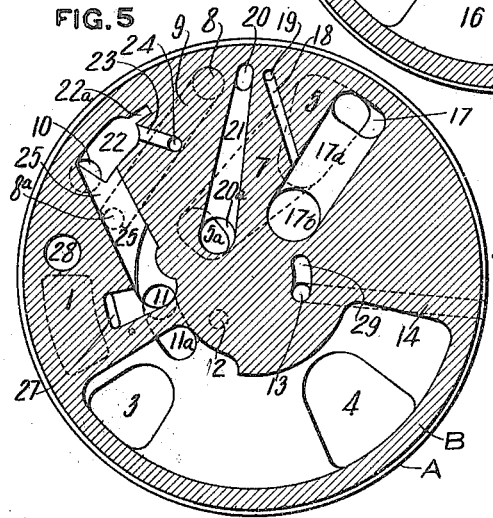
Figure 6:
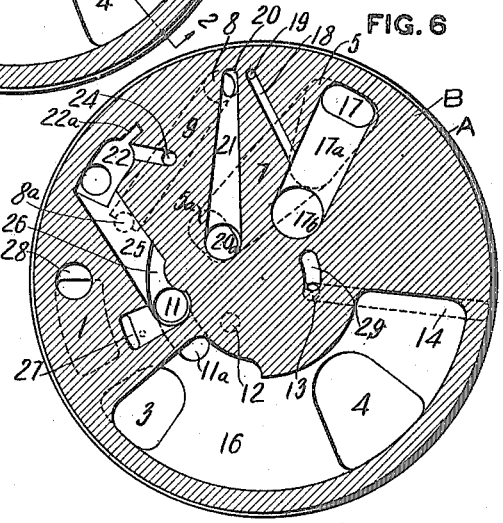

Warning port 15 is open to full release position, Fig. 13, train release and engine holding position, Fig. 12, and in all positions in which the main reservoir is directly connected to the train pipe, and in which there is danger of overcharging the train pipe if the valve is allowed to remain too long in either of these positions. The escape of air through the small port 15 advises the engineer that the valve is in such position that overcharging of the train line is likely to occur if the valve is allowed to remain too long in that position.

The valve described has the usual functions of engineers' valves, that is to say, to apply the brakes on the engine and throughout the train simultaneously, either in service or emergency applications, to hold said brakes applied, and to release said brakes, and furthermore, provides for releasing the engine brakes without releasing the train brakes, or releasing the train brakes while holding the engine brakes applied, or applying the engine brakes independently of the train brakes. It, therefore, gives full control of the engine and train brakes either simultaneously or independently and enables the various combinations to be effected from any position of the valve. The valve is of the usual type and no complications of construction or operation have been introduced. There is sufficient lapping in the various positions to prevent leakage, and wear of the parts is no greater than with the standard type of engineers' brake valves now in use, and the mechanical construction is such that the seat and rotary disk can be ground without disturbing the pipe connections.

The system for which the valve illustrated and described is particularly adapted, and which shows the several connections referred to hereinbefore, is illustrated, described and claimed in my Patent No. 1,102,099, dated June 30, 1914.

What I claim is:—

1. An engineer's brake valve provided with ports communicating with the atmosphere, train pipe, main reservoir, equalizing reservoir and a brake cylinder, and a valve provided with cavities and passages coöperating with said ports and arranged in running position to connect the main reservoir with the train pipe and the equalizing reservoir, in service position to blank the train pipe and brake cylinder ports and connect the equalizing reservoir port with the atmosphere, and in a position adjacent to the service application position to blank the equalizing reservoir port and connect the brake cylinder port to the atmosphere.

2. An engineer's brake valve provided with ports communicating with the atmosphere, train pipe, main reservoir, equalizing reservoir and a brake cylinder, and a valve provided with cavities and passages coöperating with said ports and arranged in running position to connect the main reservoir with the train pipe and with the equalizing reservoir, in service application position to blank the train pipe port and connect the equalizing reservoir port with the atmosphere, and in another position to blank the train pipe port and open a restricted communication from the main reservoir to the equalizing reservoir.

3. An engineer's brake valve provided with ports communicating with the atmosphere, train pipe, main reservoir, equalizing reservoir and a brake cylinder, and a valve provided with cavities and passages coöperating with said ports and arranged in one position to connect the main reservoir by way of a reducing valve to the train pipe and to the equalizing reservoir and blank the brake cylinder and exhaust ports, in an adjacent position to maintain the connection from the main reservoir to the train pipe and equalizing reservoir and also connect the brake cylinder with the atmosphere, in another position to blank the train pipe and brake cylinder ports and connect the equalizing reservoir port with the atmosphere, and in an adjacent position to blank the train pipe port and equalizing reservoir ports and connect the brake cylinder port with the atmosphere.

4. An engineer's brake valve provided with ports communicating with the atmosphere, train pipe, main reservoir, equalizing reservoir and a brake cylinder, and a valve provided with cavities and passages coöperating with said ports and arranged in one position to connect the main reservoir directly to the train pipe and also with the equalizing reservoir and simultaneously blank the brake cylinder port, and in another position to blank the train pipe and brake cylinder ports and connect the main reservoir to the equalizing reservoir port through a restricted passage.

5. An engineer's brake valve provided with ports communicating with the atmosphere, train pipe, main reservoir, equalizing reservoir and a brake cylinder, and a valve provided with cavities and passages coöperating with said ports and arranged in one position to blank the train pipe, brake cylinder and exhaust ports and connect the main reservoir to the equalizing reservoir, and in another position to blank the train pipe, exhaust and equalizing reservoir ports and connect the main reservoir with the brake cylinder.

6. An engineer's brake valve provided with ports communicating with the atmosphere, train pipe, main reservoir, equalizing reservoir and a brake cylinder, and a valve provided with cavities and passages coöperating with said ports and arranged in one position to blank the train pipe, brake cylinder and exhaust ports and connect the main reservoir to the equalizing reservoir, in another position to blank the train pipe, exhaust and equalizing reservoir ports and connect the main reservoir with the brake cylinder, and in another position to connect the main reservoir with the train pipe and the brake cylinder with the atmosphere.

7. An engineer's brake valve provided with ports communicating with the atmosphere, train pipe, main reservoir, equalizing reservoir and a brake cylinder, and a valve provided with cavities and communicating passages arranged in full release position to connect the brake cylinder with the atmosphere, in graduated release position to connect the main reservoir with the equalizing reservoir, and in another position to connect the main reservoir to the brake cylinder.

8. An engineer's brake valve provided with ports communicating with the atmosphere, train pipe, main reservoir, equalizing reservoir and two ports communicating with a brake cylinder, and a valve provided with cavities and passages coöperating with said ports and arranged in three different positions to connect one of said brake cylinder ports to the atmosphere, and in another position to connect the other of said brake cylinder ports with the main reservoir.

9. An engineer's brake valve provided with ports communicating with the train pipe, main reservoir, equalizing reservoir and a brake cylinder and with two ports communicating with the atmosphere, and a valve provided with cavities and passages coöperating with said ports and arranged in one position to connect the train pipe port with one of said exhaust ports, in another position to connect the brake cylinder port with the other of said exhaust ports, and in still another position to connect the brake cylinder port to the last named exhaust port and simultaneously connect the train pipe port to the main reservoir port.

10. An engineer's brake valve provided with ports communicating with the atmosphere, train pipe, main reservoir, equalizing reservoir and a brake cylinder, and a valve coöperating with said ports and provided with cavities arranged in one position to connect the equalizing reservoir to the atmosphere, and in three other positions to connect the brake cylinder to the atmosphere.

11. An engineer's brake valve provided with ports communicating with the atmosphere, train pipe, main reservoir, equalizing reservoir and brake cylinder, and a valve coöperating with said ports and provided with ports and communicating passages arranged in one position to connect the equalizing reservoir to the atmosphere through a large passage, in another position to connect the equalizing reservoir to the atmosphere through a restricted passage, and in another position to connect the brake cylinder with the atmosphere and simultaneously blank the train pipe port.

12. An engineer's brake valve provided with ports communicating with the atmosphere, train pipe, main reservoir, equalizing reservoir, and a brake cylinder, and a valve coöperating with said ports and provided with three cavities, one arranged in one position of the valve to connect the brake cylinder port with the atmosphere, another arranged in another position of the valve to connect the brake cylinder port to the atmosphere, and the third arranged in still another position to also connect the brake cylinder port to the atmosphere.

In testimony whereof, I have hereunto set my hand.

JACOB RUSH SNYDER.

Witnesses:
F. W. WINTER,
WILLIAM B. WHARTON.

Copies of this patent may be obtained for five cents each, by addressing the "Commissioner of Patents, Washington, D. C."